No. 666,994. Patented Jan. 29, 1901.
F. O. ZEINWOLDT.
FRAME OR BRACKET FOR BEARINGS.
(Application filed June 20, 1900.)
(No Model.) 2 Sheets—Sheet 1.
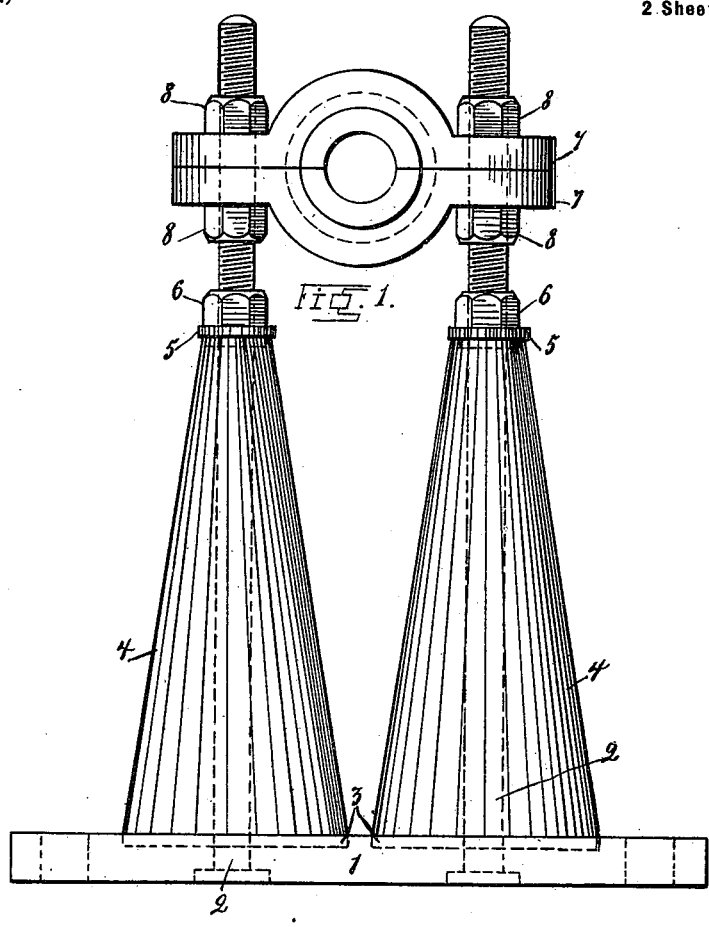
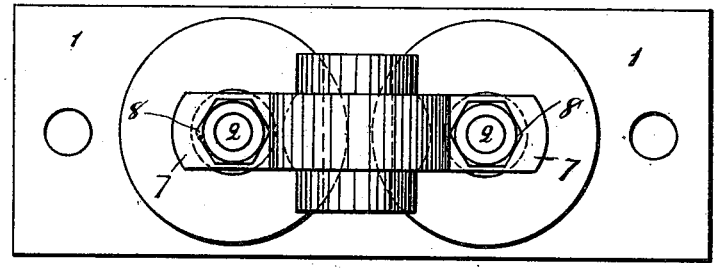
Witnesses:
J. D. McMahon.
J. Buehler.
Inventor,
Frans Oskar Zeinwoldt
by B. Singer
Att'y.
THE NORRIS PETERS CO., PHOTO-LITHO., WASHINGTON, D. C.

No. 666,994. Patented Jan. 29, 1901.
F. O. ZEINWOLDT.
FRAME OR BRACKET FOR BEARINGS.
(Application filed June 20, 1900.)
(No Model.) 2 Sheets—Sheet 2.
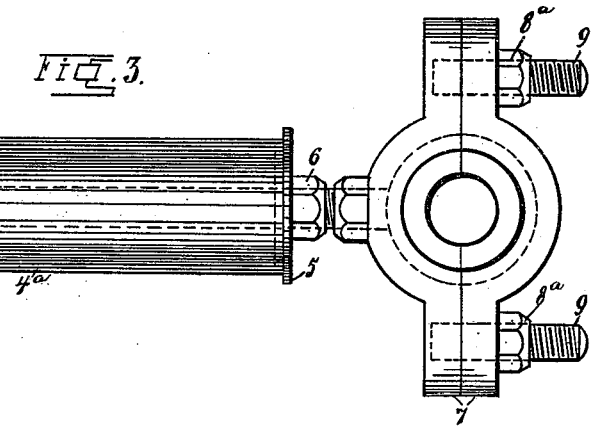
Fig. 3.
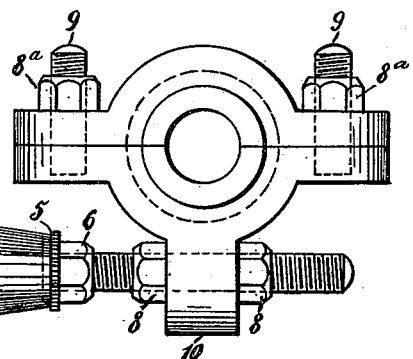
Fig. 4.
Witnesses:
J. W. McMahon.
J. Buehler.
Inventor,
Frans Oskar Zeinwoldt
by B. Singer
Att'y.

UNITED STATES PATENT OFFICE.

FRANS OSKAR ZEINWOLDT, OF KIMSTAD, SWEDEN.

FRAME OR BRACKET FOR BEARINGS.

SPECIFICATION forming part of Letters Patent No. 666,994, dated January 29, 1901.

Application filed June 20, 1900. Serial No. 20,977. (No model.)

*To all whom it may concern:*

Be it known that I, FRANS OSKAR ZEINWOLDT, land-owner, a subject of the King of Sweden and Norway, and a resident of Kimstad, in the Kingdom of Sweden, have invented new and useful Improvements in Frames or Brackets for Bearings, of which the following is a specification, reference being had to the accompanying drawings.

This invention relates to improvements in frames or brackets for bearings, the object of the invention being to reduce the weight of such frames or brackets without reducing their strength.

The accompanying drawings show three different constructive forms of this invention.

Figure 1 and 2 represent a side view and a top view, respectively, of one of said constructive forms. Figs. 3 and 4 show side views of two modifications, the modification in Fig. 4 being shown partly in section.

According to Figs. 1 and 2 the bearing-frame consists of a plate 1, applied to the fixed supporting-plane or mounting-place, and to which are firmly attached two bolts 2. The bolts are surrounded by concentric grooves 3, formed in said plate at a considerable distance from the bolts, and in which are accurately fitted the wide ends of hollow conical bodies or tubes 4, consisting of iron, wood, or other suitable material. In the convergent ends of the conical bodies or tubes 4 are inserted plates or disks 5, having turned edges. The bolts 2 are threaded to the tubes 4 and are provided along the threaded portions above the tubes 4 with firmly-tightened nuts 6 on the outer surfaces of the disks 5, whereby the bolts 2 are safely supported in every direction. The free ends of the bolts 2 carry the clamps 7, surrounding the journal-box, and which may be adjusted into the desired positions by means of the nuts 8. The tubes 4 may be replaced by hollow cylinders $4^a$ of considerable diameter to afford a broad bearing on said base, as clearly shown in Fig. 3. In Figs. 3 and 4 only one hollow body or tube, of a cylindrical or conical shape, is employed. The arrangement of the clamps of the journal-boxes will in this case be somewhat modified. In Fig. 3 the one clamp is attached directly to the bolt 2, and special bolts 9, provided with nuts $8^a$, are used to adjust the clamps relatively to one another. Otherwise the arrangement is similar to that shown in Figs. 1 and 2. Fig. 4 shows another manner of attaching the clamps. By means of a projection 10 on one of the clamps this can be attached directly to the bolt 2. In other respects the arrangement does not differ from the arrangements described above. The bearing frames or brackets may be mounted in every position, projecting, for instance, horizontally from a wall or vertically from a ceiling. Frames or brackets having conical tubes are more stable and reliable than those having cylindrical tubes. Moreover, if the tubes are two in number in each frame or bracket this will be very suitable. Brackets with only one tube, either cylindrical or conical, may, however, be preferable in some cases—as, for instance, when the space is small or when the weight of the bracket should be considered.

Having thus described my invention, what I claim is—

1. In a bearing-bracket the combination of a base-plate, a bolt projecting therefrom and screw-threaded at its outer end, a tube having a broad bearing on said base and secured thereto concentrically with said bolt, a disk sitting in the farther end of said tube and through which the bolt passes, a nut upon said bolt, tightened down upon the outer surface of the disk, and bearing-clamps secured to the screw-threaded end of said bolt beyond said nut.

2. In a bearing-bracket the combination of a base-plate, a bolt projecting therefrom and screw-threaded at its outer end, a conical tube secured by its flaring end to said base concentrically with said bolt, a disk sitting in the apex of said tube and through which the bolt passes, a nut upon said bolt tightened down upon the outer surface of the disk, and bearing-clamps secured to the screw-threaded end of said bolt beyond said nut.

3. In a bearing-bracket the combination of a base-plate, a bolt projecting therefrom and screw-threaded at its outer end, there being a groove in said base-plate concentric with said bolt and at a distance therefrom, a conical tube sitting by its flaring end in said groove and inclosing the spindle of the bolt, a disk sitting in the apex of the tube and through which the bolt passes, a nut upon the bolt tightened down upon said disk, and bearing-clamps secured to the screw-threaded end of the bolt beyond said nut.

In witness whereof I have hereunto set my hand in presence of two witnesses.

FRANS OSKAR ZEINWOLDT.

Witnesses:
CHARLES SPRINGER,
HENNING WINGGWITE.